Figure 1:
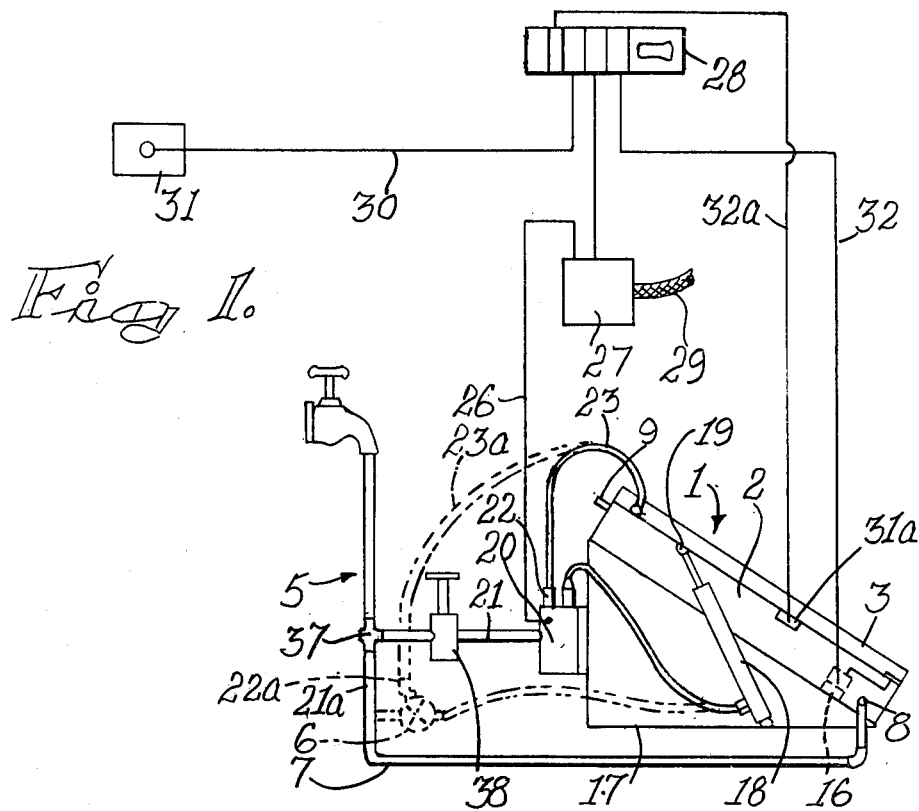

United States Patent [19]

Katz

[11] 4,128,096
[45] Dec. 5, 1978

[54] SOLAR HEATERS

[76] Inventor: Solly Katz, P.O. Box 78036, Sandton, South Africa, 2146

[21] Appl. No.: 713,827

[22] Filed: Aug. 12, 1976

[30] Foreign Application Priority Data

Aug. 13, 1975 [ZA] South Africa .................. 75/5220
Oct. 13, 1975 [ZA] South Africa .................. 75/6445
Mar. 12, 1976 [ZA] South Africa .................. 76/1562

[51] Int. Cl.² ............................................. F24J 3/02
[52] U.S. Cl. ................................... 126/271; 237/1 A
[58] Field of Search ............ 126/270, 271; 237/1 A; 16/49, 52, 56, 58, 66, DIG. 7, DIG. 9

[56] References Cited
U.S. PATENT DOCUMENTS 2,030,350  2/1936  Bremser .......................... 126/271 X
3,273,558  9/1966  Boothe ............................... 126/271
3,822,692  7/1974  Demarest ........................... 126/271

Primary Examiner—William F. O'Dea
Assistant Examiner—Larry Jones
Attorney, Agent, or Firm—Smyth, Pavitt, Siegemund, Jones & Martella

[57] ABSTRACT

A solar heater with a collector and an insulating lid operated by water pressure means to cover the collector when the celestial radiation drops below a predetermined value and to uncover the collector when the celestial radiation rises above a predetermined value. The water pressure means may be manually operated or electrically by means of a solenoid type valve activated through one or more heat sensitive devices located near or on the heater.

40 Claims, 2 Drawing Figures

U.S. Patent  Dec. 5, 1978  4,128,096

SOLAR HEATERS

This invention relates to improvements in solar heaters.

Conventional solar heater systems usually include a collector comprising one or more heat absorbing elements adapted to be located in position where they may be subjected to celestial radiation for the maximum possible time.

Such conventional systems suffer from various disadvantages. Thus, for example heat losses from the system tend to occur during periods of time when there is a decrease in the celestial radiation such as for example at night, at overcast periods of the day, etc. or when some of the heating medium is withdrawn from the system for passing on to a separate storage tank where heat losses may occur or from which the cooled down medium may pass under a reverse flow, to the heater. Another disadvantage relates to the daily and/or seasonal variation in the position of the sun the angle of incidence of its rays on the collector varies which of course results in a loss of efficiency.

Various suggestions have been made to overcome these problems but as far as the applicant is aware none of the existing arrangements present a completely practical solution for overcoming these problems.

It is accordingly an object of this invention to provide a solar heater and system which the applicant believes has certain distinct advantages over the known arrangements.

According to the invention a solar heater is provided including an insulating lid or the like adapted to cover the collector when the celestial radiation decreases below a predetermined value; and water pressure operated means adapted for closing and opening the lid when the celestial radiation drops below and rises above the aforesaid predetermined value.

It will be appreciated that with the lid in the closed position the possibility of heat losses occuring from the system is minimised.

In one form of the invention the water pressure means may be manually operated.

This may for example be done by the opening and closing of a manually operated valve or the like in the water supply line to the heater.

In another form of the invention the water pressure means may be electrically operated.

Thus, for example, the water pressure means may include an electrically operated valve preferably of the solenoid type.

Further according to the invention the water pressure operated means may include a piston adapted under the influence of the water pressure to move the lid to the opened or closed position.

Further according to the invention the heater includes a movable collector and a timed water pressure operated means adapted for automatically directing the collector towards the sun throughout the day in a manner so that the rays of the sun strikes the collector and preferably at an angle of incidence of not more than 40°.

Further according to the invention the collector is rotatable through an angle of at least 180° in a horizontal plane.

Further according to the invention the timed water pressure operated means, for rotating the collector comprises an arrangement similar to the means adapted for opening and closing the lid of the heater.

Further according to the invention the collector is adapted to be tilted to an angle to the horizontal which angle will depend on the particular latitude of the plane of intended erection of the heater.

Further according to the invention the tilting of the collector is variable to compensate for seasonal variation of the sun's position.

Preferably a timed water pressure operated means is provided for automatically effecting the variation in tilting of the collector.

This means may be similar to the means adapted for rotating the collector.

Still further according to the invention the collector of the heater comprises a cover member located on a container of a heat insulating material defining a concavity adapted to receive a heating medium.

Further according to the invention the heat insulating material comprises a foamed synthetic resinous material encased in a reinforcing skin which is impervious to the heating medium.

In one form of the invention the reinforcing skin is of a reinforced cementitious material.

Preferably the cementitious material is glass reinforced such as that known by the trade name CEMFIL (or GRC) manufactured by Pilkingtons of England.

In another form of the invention the reinforcing skin may comprise an epoxy type substance which may be coated onto the outside of the foamed synthetic resinous material.

In another form of the invention the cementitious material may be reinforced with a suitable plastics material such as polypropylene for example.

Further according to the invention the interior surface of the container includes a first step formation in the region of the lip of the concavity, the step formation being adapted to receive the periphery of the cover member.

Preferably a translucent shield, for example of glass, is provided to overlie the heat cover member.

Preferably the interior surface of the container includes a second step formation adapted to receive the translucent shield.

Also according to the invention the reinforcing skin is strengthened in the zone of the first step formation to accommodate fastening means for the cover. The fastening means may for example be bolts with their heads embedded in the skin material. Alternatively nuts or stud receiving elements may be cast within the material.

Further according to another aspect of the invention the container is adapted also to serve the function of a roof tile, the container being characterised in coupling formations thereon communicating with the inlet and outlet of the container, the arrangement being such that when a series of containers are located on underlying support battens in abutting relationship in rows with the lower edges of the containers in each row overlying the containers in a preceding row, the interiors of overlapping containers and/or abutting containers are coupled to one another by virtue of interengagement of the coupling formations, so that a fluid path generally leading upwardly towards the apex of the roof is defined through the containers. In one arrangement the coupling formations are spigot and socket formations, each spigot formation being adapted to engage in a complimentary socket formation in an abutting or overlapping relationship with the container and vice versa.

Further according to this aspect of the invention an outwardly directed lip formation may be defined on one side of the container, the lip being adapted to overlie a container in a preceding row in use.

Further according to that embodiment of the invention where the water pressure means for opening and closing the lid is electrically operated the solar heater includes a first temperature sensitive device located in the container; and a second temperature sensitive device located outside but in the vicinity of the container; the devices being adapted to actuate the water pressure means into opening the lid when the temperature of the second device rises above that of the first device and into closing when the temperature of the second device drops below that of the first device.

As will be appreciated the heat capacity of the heating medium in the container ensures that the first heat sensitive device does not undergo such rapid temperature changes as what the case is with the second heat sensitive device. Accordingly during the course of the night the temperature of the first device will not drop below that of the second device and the lid will accordingly remain closed. Also, even after the sun has started to rise in the morning the lid will remain closed for some time until the temperature outside the container is higher than that of the heating medium inside the container whereafter the lid will open.

The lid of the heater will continue to remain open for as long as the temperature outside the container is higher than that of the heating medium inside it. Thus, for example, if a sudden change in atmospheric temperature occurs, as for example when the sky becomes heavily overcast etc. the temperature of the second device will drop more rapidly than that of the first device and the lid will accordingly soon be actuated into closing. This arrangement will also serve the purpose of protecting the collecting surface from damage during hail storms or the like.

The heat sensitive devices may be of any suitable type.

Thus in one form of the invention they may be of the type including one or more thermistors.

In another form of the invention they may be of the type including one or more thermistors.

In another form of the invention they may be of the type including one or more thermostats.

In yet another form of the invention they may comprise suitable electronic devices.

In one form of the invention the second device may be mounted on the outside of the container.

The second device may for example comprise a box-like container in which the sensor is mounted on a heat absorbent plate which is insulated on all sides except for that intended to face the sun; the box, being mounted on the side of the container and having that side thereof facing the sun provided with a glass window or the like.

Where the container is covered with a translucent sheet facing the sun the first device may be mounted on the underside of the sheet.

Preferably the interior of the fluid container and the inside of the box-like container are both painted a matt black. Both sensors will accordingly be equally sensitive to heat reaching them through celestial radiation.

It will be appreciated that the arrangement according to the invention provides means which causes the automatic opening and closing of the lid hence ensuring that the available celestial energy is utilized to its maximum.

Still further according to the invention the heater includes an electric element adapted to heat the heating medium only when the lid is in the closed position or when an overriding switch is operated, while the lid is in the open position.

With this arrangement the element may ensure that the temperature of the medium is maintained at a predetermined level when the heater is not in operation or when there is a sudden drop in the temperature of the medium say as a result of a large withdrawal of heated medium from the heater.

Preferably the element is switched on or off automatically when the lid is closed or opened.

Thus, for example, in one form of the invention, a switch button may be provided on the lid or associated with the collector, the button being automatically operated when the lid closes or opens onto the collector.

Preferably the arrangement also includes a thermostat or the like associated with the element which is adapted to ensure that the element only comes into operation when the temeprature of the heating medium drops below a predetermined level.

Thus, when the lid is closed and the said switch activated the thermostat will ensure that the element is only switched on when the temperature of the medium drops below the aforesaid level.

Further according to the invention the inner face of the lid is provided with a reflective surface adapted to pass light falling onto it onto the collector.

In one form of the invention the reflective surface may be of parabolic configuration.

Still further according to the invention the collector includes means adapted to pass a cleaning fluid over the cover member which means is actuated by the closing of the lid onto the cover member.

In one form of the invention the cleaning fluid may comprise water passing from the water pressure operated means on closing of the lid.

In one form of the invention the lid may comprise at least one hingedly mounted member.

In another form of the invention the lid may comprise at least one slidably mounted member.

Figure 2:
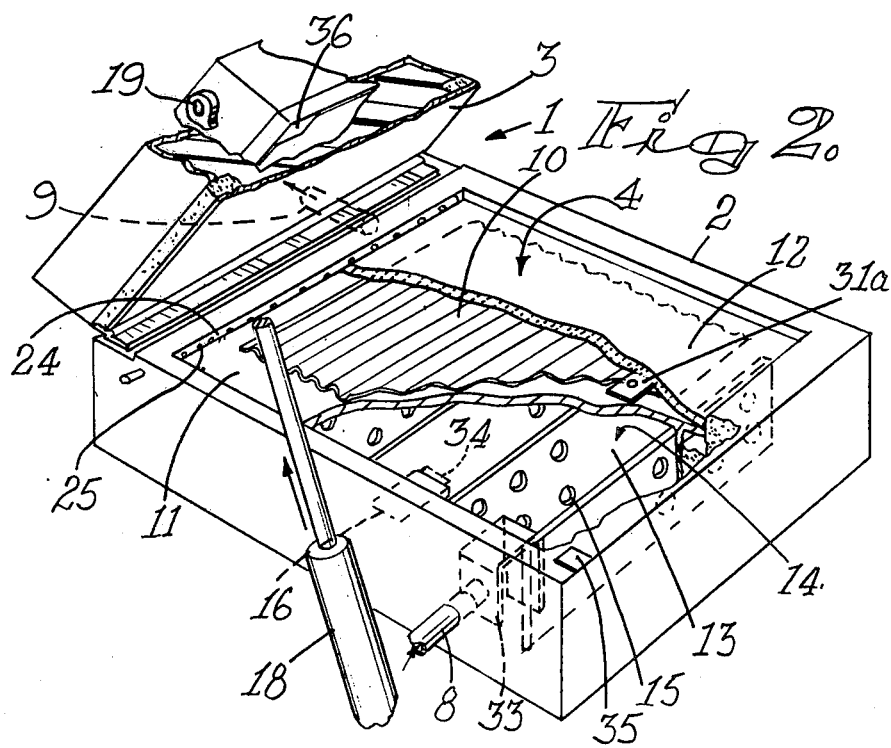

The invention will now be further described by way of example with reference to the enclosed drawings in which:

FIG. 1 is a diagrammatic side elevation of a solar heater system according to the invention; and FIG. 2 is a diagrammatic perspective view showing the solar heater of the system of FIG. 1 in more detail.

In FIG. 1 the arrangement for the manually operated means for opening and closing the lid is shown in dotted lines.

In both the manually and electrically operated embodiments of the invention the solar heater includes a collector generally denoted 1 comprising a container 2 provided with a heat insulating lid 3 hingedly mounted thereto, for movement from a closed position (as shown in FIG. 1) to an open position (as shown in FIG. 2). The underside of lid 3 is provided with a reflective surface which is preferably of parabolic configuration.

Container 2, which is of a heat insulating foamed synthetic resinous material which is encased in a reinforcing skin of a reinforced cementitious material of the type known by the trade name CEMFIL (or GRC) (Pilkington) defines a concacity 4 adapted to contain a heating medium such as water, for example.

Water from a mains supply 5 may be passed into concavity 4 via pipe 7 through a bottom inlet 8 and out of concavity 4 through a top outlet 9.

Container 2 is provided in the region of the lip of concavity 4 with a first step formation adapted to receive the periphery of a plate like cover member comprising a corrugated heat conductive metal plate 10 which may be welded onto a metal sheet 11.

Container 2 is also provided with a second step formation disposed outwardly relative to the first step formation and adapted to receive the periphery of a glass sheet 12.

The outside face of plate 10 is coated with a suitable matt black covering.

Concavity 2 is also provided with a plurality of transversely extending spaced baffle plates 13 dividing concavity 2 into a plurality of chambers 14.

Each plate 13 includes towards one of its ends a set of apertures 15 which is off set relative to the aperture of the plates adjacent to it.

In the electrically operated arrangement concavity 2 also includes an electrically operated heating element 16 and a thermostat 34 associated therewith.

As can be seen in FIG. 1 collector 1 is tilted to the horizontal so that the collecting surface defined by plate 10 can be directed towards the sun. Collector 2 is also movable through an angle of at least 180° in the horizontal plane by having container 2 rotatably mounted on a pedestal or the like 17 which is also adapted to allow for the tilting movement of collector 1.

Pedestal 17 has one end of a piston 18 connected thereto the opposite end 19 of which is pivotally connected to lid 3.

In the electrically operated arrangement piston 18 is fed via a solenoid operated valve 20 and pipe 21 with water from mains supply 5 via a T-joint 37.

A timed water pressure operated mechanism (not shown) adapted to cause the rotation and/or tilting of collector 1 is also provided.

Valve 20 includes a pressure release port 22 which is connected via a line 23 to a pipe 24 which extends transeversely over glass sheet 12 and which includes a plurality of apertures 25 adapted to squirt water over substantially the entire surface of sheet 12.

Valve 20 is connected via electrical conduit 26 and a transformer 27 to a control box 28. Transformer 27 is connected to a electrical mains supply 29.

Control box 28 is also connected via a conduit 30 to a first heat sensitive device 31 and via line 32a to a second heat sensitive device 31a which is mounted on plate 10 in concavity 4 of container 2.

Box 28 is also connected via a conduit 32 to a contact point 35 mounted on the outside upper periphery of container 2 and adapted to come in contact with a contact point 36 mounted in a corresponding position on lid 3 when lid 3 closes onto container 2.

For operation of the electrically operated arrangement collector 1 is tilted to the required angle and moved to the starting point of its rotation. Water mains supply 5 is operated and electrical mains supply 29 switched on.

The timed water pressure means (not shown) is accordingly actuated to set collector 1 into rotation at a predetermined speed to allow the collector to follow the movement of the sun as it travels along its path during the day.

As soon as the device 31 reaches a predetermined temperature due to celestial radiation valve 20 may be actuated to pass water to piston 18 which then causes lid 3 to open.

Lid 3, however, will not open until the temperature recorded by device 31 is higher than that recorded by device 31a.

With lid 3 in the open position collector plate 10 will be heated up through celestial radiation which heat will be conducted to the water inside concavity 4. The reflective surface on the underside of lid 3 will facilitate such heating operation. Due to the presence of baffle plates 13 with their off set apertures 15 the water will as a result of a thermo syphonic action flow in a rising substantially zig-zag path between inlet 8 and outlet 9 thus allowing the water to absorb the maximum amount of heat from collector plate 10. Baffles 13 also serve the purpose of preventing mixing of hot and cold water during the draining off of hot water from the heater.

As soon as the temperature of device 31 decreases below a predetermined value, for example, when night falls, valve 20 will be actuated to allow piston 18 to return to its contracted position, thus causing lid 3 to close on container 2. This will cause the water in piston 18 to pass via exhaust port 22 and line 23 to pipe 24 and through apertures 25 onto glass sheet 12 to wash the latter clean of any dirt which may have collected on it.

If during the course of the day a sudden change in the ambient temperature occurs, say for example, as a result of the sky becoming heavily overcast etc, device 31 will also cause lid 3 to close as soon as its temperature drops below that of device 31a. Lid 3 will then remain closed until the temperature of device 31 rises above that of device 31a.

If required, while lid 3 is in the closed position, electrical element 16 may be actuated into operation to heat up the water in container 2 by means of an overriding switch (not shown).

After collector 1 has reached the end of its path of rotation the device responsible for its rotation is either de-actuated and collector 1 allowed to return to its starting point by means of a spring or the like (not shown) or the direction of the water pressure may be switched around for this purpose.

In the manually operated arrangement (which will not include line 21 shown in FIG. 1) water from mains supply 5 will pass via lines 21a and 7 to bottom inlet 8 in container 32. Part of this water may pass through three way valve 6 to the bottom of cylinder 18 via the line shown dotted in FIG. 1.

When valve 6 is manually operated to allow water to flow into the bottom of cylinder 18 the latter will cause lid 3 to open under influence of the water pressure.

When valve 6 is manually closed to stop the flow of water from mains supply 5 lid 3 will under the influence of gravity moved to the closed position. At the same time the water in cylinder 18 will pass via exhaust valve 22a and line 23a to pipe 24 and through apertures 25 to wash sheet 12 in the same manner as set out in the electrically operated arrangement.

It will be appreciated that the arrangement according to the invention allows for a solar heater system which can make the maximum use of the available celestial radiation.

It will be appreciated that collector 2, suitably adapted, may be incorporated as part of a roof structure or the like.

It will be further appreciated that with a solar heater and system according to the invention many variations in detail are possible without departing from the scope of the appended claims. Thus, for example, cleaning of sheet 12 may be effected manually, or by water passed directly from the water mains supply 5. Also, in the electrically operated mechanism 31 and 31a may comprise photosensitive devices instead of heat sensitive ones. Furthermore, instead of lid 3 closing under the influence of gravity the direction of the water pressure may be reversed via suitable means to force lid 3 into hermetically tight sealing engagement with container 2.

I claim:

1. A solar heater adapted to receive water under pressure from a source outside the heater, the heater including a celestial radiation receiving collector, receiving said water; an insulating lid for covering the collector when the celestial radiation decreases below a predetermined value; and a water pressure responsive means including a piston being operated by water under pressure from said source for closing and opening the lid when the celestial radiation drops below and rises above the aforesaid predetermined value.

2. The heater of claim 1 wherein the water pressure means is manually operated.

3. The heater of claim 2 including a manually operated valve or the like located in the water supply line between the source and the water pressure operated means.

4. The heater of claim 1 wherein the water pressure means is electrically operated.

5. The heater of claim 1 wherein the water pressure means include an electrically operated valve connected between said source and said means.

6. The heater as in claim 5, said valve being of the solenoid type.

7. The heater of claim 1, said collector being movable, said heater including means for automatically directing the collector towards the sun throughout the day in a manner so that the rays of the sun strike the collector at an angle of incidence of not more than 40°.

8. The heater of claim 7 wherein the collector is rotatable through an angle of at least 180° in a horizontal plane.

9. The heater of claim 1 wherein the collector is adapted to be tilted to an angle to the horizontal which angle will depend on the particular latitude of the plane of intended erection of the heater.

10. The heater of claim 9 wherein the tilting of the collector is variable to compensate for seasonal variations of the sun's position.

11. The heater of claim 10 wherein a timed water pressure operated means is provided for automatically effecting the variation in tilting of the collector.

12. A solar heater as in claim 1, said collector comprising a container connected to a source of water, a cover member located on the container, the container being made of a heat insulating material, the cover member covering the container.

13. The heater of claim 12 wherein the heat insulating material comprises a foamed synthetic resinous material encased in a reinforcing skin which is impervious to the water.

14. The heater of claim 13 wherein the reinforcing skin is of a reinforced cementitious material.

15. The heater of claim 14 wherein the reinforcing skin comprises an epoxy type substance which is coated onto the outside of the foamed synthetic resinous material.

16. The heater of claim 14 wherein the cementitious material is glass reinforced.

17. The heater of claim 14 wherein the cementitious material is reinforced by a plastics material.

18. The heater of claim 17, said plastic material being polypropylene.

19. The heater of claim 12 wherein the interior surface of the container includes a first step formation along its periphery receiving the periphery of the cover member.

20. The heater of claim 12 including a translucent shield, overlying the cover member.

21. The heater of claim 12 wherein the interior surface of the container includes a step formation receiving a translucent shield overlying the cover member.

22. The heater of claim 12, including a reinforcing skin for the container and being strengthened to accommodate fastening means for the cover member.

23. The heater of claim 12, including fastening means for the cover member in the skin material.

24. The heater of claim 1 including an electric element for heating the water in the container only when the lid is in the closed position or when an overriding switch operates while the lid is in the open position.

25. The heater of claim 24 wherein the element is switched on or off automatically when the lid is closed or opened.

26. The heater of claim 25 wherein a switch button is provided on the lid or associated with the collector, the button being automatically operated when the lid closes or opens onto the collector.

27. The heater of claim 24 including a thermostat or the like for controlling the electrical element to ensure that the element comes into operation only when the temperature of the water drops below a predetermined level.

28. The heater of claim 1 wherein the inner face of the lid is provided with a reflective surface for passing light falling onto it onto the collector.

29. The heater of claim 1 including means for passing a cleaning fluid over the collector which means is actuated by the closing of the lid.

30. The heater of claim 29 wherein the cleaning fluid comprises water passing from the water pressure operated means on closing of the lid.

31. The heater of claim 1 wherein the lid comprises at least one hingedly mounted member.

32. The heater of claim 1 wherein the lid comprises at least one slidably mounted member.

33. The heater of claim 1, wherein the water pressure means includes an available main supply for water under pressure.

34. A solar heater comprising:
a container for water made of heat insulating material;
a cover on the container for absorbing celestial radiation when being exposed thereto;
a lid movably disposed to selectively cover and expose the cover to celestial radiation;
water pressure means connected for opening and closing the lid;
a first temperature sensitive device located in the container;
and a second temperature sensitive device located outside but in the vicinity of the container;
the devices being connected to actuate the water pressure means into opening the lid when the temperature of the second device rises above that of the first device and into closing when the temperature of the second device drops below that of the first device.

35. The heater of claim 34 wherein the heat sensitive devices include one or more thermistors.

36. The heater of claim 34 wherein the heat sensitive device include one or more thermostats.

37. The heater of claim 34 wherein the heat sensitive devices comprise one or more electronic devices.

38. The heater of claim 34 wherein the second device is mounted on an outside wall of the container.

39. The heater of claim 38 wherein the second device comprises a box-like container in which the sensor is mounted on a heat absorbent plate which is insulated on all sides except for that intended to face the sun; the box, being mounted on the side of the container and having that side thereof facing the sun provided with a glass window or the like.

40. The heater of claim 34 wherein the first temperature sensitive device is mounted on the underside of translucent sheet overlying the cover.

* * * * *